(12) United States Patent
Giverts et al.

(10) Patent No.: US 9,342,592 B2
(45) Date of Patent: May 17, 2016

(54) METHOD FOR SYSTEMATIC MASS NORMALIZATION OF TITLES

(71) Applicant: Workday, Inc., Pleasanton, CA (US)

(72) Inventors: Vladimir Giverts, San Francisco, CA (US); Jonathan Goldman, Mountain View, CA (US); Adeyemi Ajao, San Francisco, CA (US); Barzel Segal, San Francisco, CA (US); Phil Monroe, San Francisco, CA (US); Kristy Gateley, San Bruno, CA (US); Jan Prach, San Francisco, CA (US); Tarek Rabbani, San Jose, CA (US); Efraim Feinstein, Palo Alto, CA (US); Anuranjita Tewary, Mountain View, CA (US); Lucian Lita, Sunnyvale, CA (US)

(73) Assignee: Workday, Inc., Pleasanton, CA (US)

( * ) Notice: Subject to any disclaimer, the term of this patent is extended or adjusted under 35 U.S.C. 154(b) by 210 days.

(21) Appl. No.: 13/953,444

(22) Filed: Jul. 29, 2013

(65) Prior Publication Data
US 2015/0032747 A1   Jan. 29, 2015

(51) Int. Cl.
G06F 17/30   (2006.01)
G06F 17/27   (2006.01)

(52) U.S. Cl.
CPC ........ *G06F 17/3071* (2013.01); *G06F 17/2715* (2013.01); *G06F 17/30091* (2013.01); *G06F 17/30528* (2013.01); *G06F 17/30985* (2013.01)

(58) Field of Classification Search
CPC ..................... G06F 17/30598; G06F 17/30705
USPC ........................................................ 707/737
See application file for complete search history.

(56) References Cited

U.S. PATENT DOCUMENTS

| 5,197,004 A | 3/1993 | Sobotka et al. |
| 6,728,695 B1 | 4/2004 | Pathria et al. |
| 6,965,861 B1 | 11/2005 | Dailey et al. |

(Continued)

FOREIGN PATENT DOCUMENTS

| EP | 1567956 | 8/2005 |
| WO | 2004/044779 A1 | 5/2004 |

OTHER PUBLICATIONS

Burning Glass, "Lens/Xray™", retrieved from Internet on Oct. 22, 2013 <http://www.burning-glass.com/products/lensxray.html>, 1 page.

(Continued)

*Primary Examiner* — Rehana Perveen
*Assistant Examiner* — Alexander Khong
(74) *Attorney, Agent, or Firm* — Van Pelt, Yi & James LLP

(57) ABSTRACT

A method for normalizing raw titles to canonical titles is described. The method includes designating a set of canonical titles, generating a set of n-grams for each canonical title, assigning a set of attributes to each n-gram, assigning a set of labels to each of the attributes, and storing the labeled canonical title and labeled n-grams in a database. In some examples, a new title may be mapped to an existing canonical title in the database by generating a set of n-grams for the new title, looking up the n-grams in the database of canonical titles, retrieving the set of labels assigned to n-grams in the database that match n-grams from the new title, and assigning those labels to the corresponding attributes of the new title. The new title may then be mapped to a canonical title on the basis of similarly labeled attributes.

19 Claims, 15 Drawing Sheets

(56) References Cited

U.S. PATENT DOCUMENTS

| | | |
|---|---|---|
| 7,555,441 B2 | 6/2009 | Crow et al. |
| 8,341,520 B2 | 12/2012 | Iakobashvili et al. |
| 8,346,563 B1 | 1/2013 | Hjelm et al. |
| 2002/0055870 A1 | 5/2002 | Thomas |
| 2004/0220918 A1 | 11/2004 | Scriffignano et al. |
| 2006/0229899 A1 | 10/2006 | Hyder et al. |
| 2009/0276460 A1 | 11/2009 | Dane |
| 2010/0082356 A1 | 4/2010 | Verma et al. |
| 2010/0121847 A1 | 5/2010 | Olston |
| 2011/0238591 A1 | 9/2011 | Kerr et al. |
| 2012/0215795 A1 | 8/2012 | Phelon et al. |
| 2012/0226623 A1 | 9/2012 | Jurney et al. |
| 2013/0013526 A1 | 1/2013 | Le Viet et al. |
| 2013/0110497 A1 | 5/2013 | Medero et al. |
| 2013/0110498 A1* | 5/2013 | Bekkerman ............... 704/9 |
| 2013/0173610 A1* | 7/2013 | Hu et al. ............... 707/728 |
| 2014/0214788 A1* | 7/2014 | Koutrika ............... 707/708 |

OTHER PUBLICATIONS

Burning Glass, "Pattern-Based Matching", retrieved from Internet on Oct. 22, 2013 <http://www.burning-glass.com/technology/patternbased.html>, 1 page.

Terra Information Group Inc., "ParsePro", retrieved from Internet on Oct. 22, 2013 <http://parsepro.com/>, 1 page.

* cited by examiner

TITLE: REGISTERED CHARGE NURSE ICU

UNIGRAMS
- REGISTERED
- CHARGE
- NURSE
- ICU

BI-GRAMS
- REGISTERED CHARGE
- CHARGE NURSE
- NURSE ICU

TRI-GRAMS
- REGISTERED CHARGE NURSE
- CHARGE NURSE ICU

FIG. 3

| N-grams for "Registered Nurse, PICU" | Attributes | | | | |
|---|---|---|---|---|---|
| | Job Function | Specialization | Certification | Seniority | Job Category |
| Registered | | | Registered | | |
| Nurse | Nurse | | | Low | Nursing |
| PICU | | Pediatrics, ICU | | | |
| Registered Nurse | Nurse | | Registered | Medium | Nursing |
| Nurse PICU | Nurse | Pediatrics, ICU | | Medium | Nursing |
| Registered Nurse PICU | Nurse | Pediatrics, ICU | Registered | Medium | Nursing |

FIG. 4

Registered nurse (canonical title)
- RN (representative title)
    - R.N. (raw title)
    - R.N (raw title)
    - Reg. Nurse (raw title)
- ICU RN (representative title)
    - I.C.U. R. N. (raw title)
    - ICU Reg. Nurse (raw title)
    - ICU Registered Nurse (raw title)

FIG. 7

New Title: "Certified Nurse Midwife"

| N-GRAMS | Job function | specialization | certification | seniority | Job category |
|---|---|---|---|---|---|
| Certified | | | Certified, Registered | | |
| Nurse | Nurse | | | | Nursing |
| Midwife | | | | | |
| Certified Nurse | Nurse | | Certified, Registered | | Nursing |
| Nurse Midwife | Nurse | | | | Nursing |
| Certified Nurse Midwife | Nurse, Nurse Technical Leadership | | Certified, Registered | | Nursing |

FIG. 12

Candidate Canonical Title #1:
"Advanced Practice Registered Nurse"

| N-GRAMS | Job function | specialization | certification | seniority | Job category |
|---|---|---|---|---|---|
| Advanced | | | | | |
| Practice | | | | | |
| Registered | | | Registered | | |
| Nurse | Nurse | | | | Nursing |
| Advanced Practice | | | | | |
| Practice Registered | | | Registered | | |
| Registered Nurse | Nurse | | Registered | | Nursing |
| Advanced Practice Registered | | | Registered | | |
| Practice Registered Nurse | Nurse, Nurse Technical Leadership | | Registered | | Nursing |

FIG. 13A

Candidate Canonical Title #2:
"Certified Nurse Aide"

| N-GRAMS | Job function | specialization | certification | seniority | Job category |
|---|---|---|---|---|---|
| Certified | | | Certified | | |
| Nurse | Nurse | | | | Nursing |
| Aide | | | | | |
| Certified Nurse | Nurse | | Certified | | Nursing |
| Nurse Aide | Nurse Aide | | | | |
| Certified Nurse Aide | Nurse Aide | | Certified | | Nursing |

FIG. 13B

Candidate Canonical Title #3:
"Registered Nurse"

| N-GRAMS | Job function | specialization | certification | seniority | Job category |
|---|---|---|---|---|---|
| Registered | | | Registered | | |
| Nurse | Nurse | | | | Nursing |
| Registered Nurse | Nurse | | Registered | | Nursing |

FIG. 13C

METHOD FOR SYSTEMATIC MASS NORMALIZATION OF TITLES

BACKGROUND

1. Field

This relates generally to normalizing massive amounts of data, and more specifically to a method of normalizing massive amounts of raw data using labeled n-grams.

2. Description of Related Art

Social networks have become repositories for massive quantities of personal data, including users' job titles, current and previous employers, education, and other information. This data can be used for many purposes, including recruiting. A key impediment to effectively using this data, however, is that the data can be entered by users into their network profiles in any format. As a result, there is no standardization of the data. For example, the same job title may be entered in multiple formats, using different spellings, different abbreviations, or even different words. Accordingly, a recruiter or demographer searching user profiles for a job title, e.g., "Registered Nurse," may not find users with the titles "R.N." or "Reg. Nurse," although they are semantically equivalent. This lack of standardization makes it difficult to search, analyze, and aggregate the data. Thus, a prerequisite for effectively searching, analyzing, and aggregating the data is the ability to recognize data variants having the same meaning as equivalent.

In one approach for identifying data variants that are semantically equivalent, a person may manually review a collection of user-entered data, define a data term or phrase that is representative of multiple variants of user-entered data, and create a look-up table that maps the user-entered data to a representative data term or phrase. However, this approach can be extremely time-consuming and the results may be limited to user-entered data variants that have been manually mapped.

What is needed is an efficient method and system for recognizing and identifying data variations in massive quantities of data to enable effective searching, analysis, and aggregation of the variations.

BRIEF SUMMARY

This relates to methods and systems for normalizing raw titles to canonical titles. In some examples, the method may include normalizing raw titles by designating a set of canonical titles, generating a set of n-grams for each canonical title, assigning a set of attributes to each n-gram, assigning a set of labels to each of the attributes, and storing the labeled canonical title and labeled n-grams in a database. In some examples, the database may be validated and refined using a white-box or black-box validation method.

In other examples, the method may include mapping a new title to an existing canonical title in the database by generating a set of n-grams for the new title, looking up the n-grams in the database of canonical titles, retrieving the set of labels assigned to n-grams in the database that match n-grams from the new title, and assigning those labels to the corresponding attributes of the new title. The new title may then be mapped to a canonical title on the basis of similarly labeled attributes. Systems may practice these methods.

DESCRIPTION OF THE FIGURES

FIG. 3 depicts a set of n-grams generated for an exemplary title.

FIG. 4 depicts an exemplary table of labels assigned to attributes of n-grams.

FIG. 7 depicts an exemplary hierarchy of titles.

FIG. 12 depicts an exemplary new title and associated labels.

FIG. 13A depicts an exemplary canonical title and associated labels.

FIG. 13B depicts an exemplary canonical title and associated labels.

FIG. 13C depicts an exemplary canonical title and associated labels.

DETAILED DESCRIPTION

Figure 1:
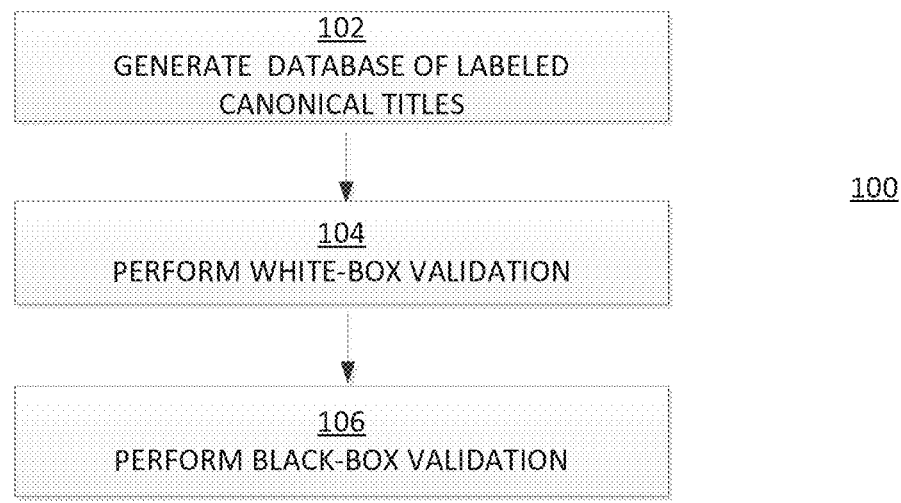
FIG. 1 depicts an exemplary method for normalizing raw titles to canonical titles.

The following description sets forth exemplary methods, parameters, and the like. It should be recognized, however, that such description is not intended as a limitation on the scope of the present disclosure but is instead provided as a description of various examples.

This relates to methods and systems for normalizing raw titles so as to easily search, analyze, and aggregate titles that are semantically equivalent. Title normalization may be done by breaking raw titles into sets of n-grams, assigning attributes and labels to each n-gram, and using these attributes and labels to map each raw title to a corresponding canonical title. A raw title may be a title that has been entered by a user, prior to any processing. An n-gram may be a set of one or more contiguous words contained within a title. An attribute may represent one aspect of the semantics of a title. A label may be a word that is assigned to an attribute and may provide information related to that attribute. Together, the labels and attributes can capture key semantic information about a title. A canonical title may be a title that is used to represent a set of semantically similar raw titles.

An approach for mapping raw titles to canonical titles will be described in more detail below with respect to FIGS. 1-13.

There may be two complementary aspects of title normalization according to various examples. In a first aspect, a database of labeled canonical titles may be generated and validated. This process may rely upon a combination of expert inputs and iterative analyses to populate the database and train the system (by refining the labels) to ensure that the system provides accurate mapping of raw titles to canonical titles. In a second aspect, once the database of labeled canonical titles has been generated and validated, it can be used by an n-gram label matching algorithm described herein to quickly map new titles to existing canonical titles on the basis of label similarities, thus enabling efficient search, analysis, and aggregation of new titles.

For the purpose of illustrating key concepts, examples described herein are related to normalizing job titles. However, methods and systems described herein can be applied to many other types of titles, where "title" can be interpreted broadly to include company titles, educational titles (such as majors, degrees, courses, or universities), address titles (such as streets or cities), hobby titles, and many other types of titles or data. The use of job titles in the examples is not to be construed as limiting; these examples are provided for illustrative purposes only.

3. Method for Generating and Validating a Database of Labeled Canonical Titles

The first aspect of the disclosed systems and methods may involve generation of a database of labeled canonical titles by normalizing a set of raw titles, then iteratively validating and training the database to ensure that it can be used to provide accurate mapping of new titles to canonical titles.

FIG. 1 depicts an exemplary method 100 for normalizing raw titles to generate a database of canonical titles and validating the database. FIG. 1 depicts the overall method, while FIGS. 2-9 provide details on each part of the method.

In the example of FIG. 1, in block 102, a database of labeled canonical titles may be generated. In some examples, the database of labeled canonical titles may be generated as described below with respect to FIG. 2.

In block 104, white-box validation may be performed. White-box validation may provide a transparent view of how raw titles have been mapped to canonical titles, thus enabling a user (or program) to assess whether to update the labels associated with the canonical titles to enable better mappings. In some examples, white-box validation may be performed as described with respect to FIG. 5.

In block 106, black-box validation may be performed. Black-box validation may be used to compare the efficacy of the n-gram label matching algorithm to another mapping methodology. In some examples, black-box validation may be performed as described with respect to FIG. 8.

In some examples, the white-box validation, the black-box validation, or both may be optional, depending on the requirements of the system.

Each of these blocks is described in more detail below.

4. Generating a Database of Labeled Canonical Titles

Figure 2:
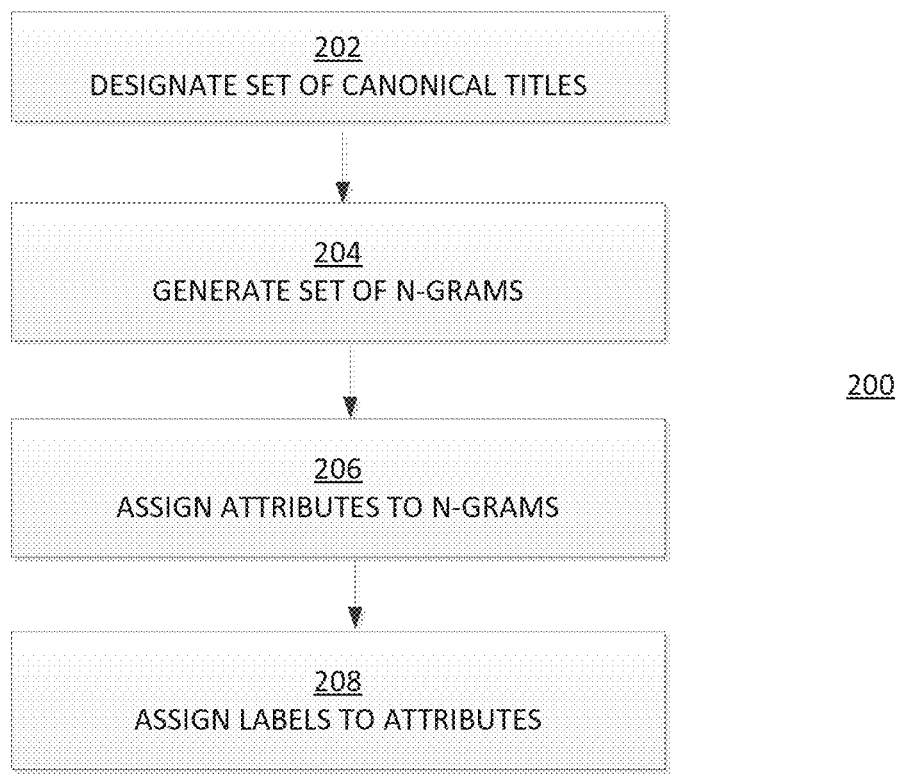
FIG. 2 depicts an exemplary method for generating a database of labeled canonical titles.

FIG. 2 depicts an exemplary method 200 for generating a database of labeled canonical titles, as depicted in block 102 of FIG. 1.

a. Designate Set of Canonical Titles

In the example of FIG. 2, in block 202, a set of canonical titles may be designated. The canonical titles may be selected from a pool of raw titles harvested from a database of user profiles based on a keyword search, for example, or may be input by a user, or may be received from some other source. In some examples, the most frequently appearing raw titles from a set of harvested raw titles may be designated as canonical titles. In alternative examples, a subject matter expert (for a specific industry, for example) may manually designate a set of canonical titles.

To illustrate the process of designating canonical titles using the example of job titles, a set of raw titles may be harvested from a database of user profiles by searching on the keyword "nurse," for example. The set of raw titles surfaced by this search may include "R.N." (25 hits), "Registered Nurse" (12 hits), "Reg. Nurse" (3 hits), etc. In this case, the most frequently occurring raw job title, "R.N.," may be designated as a canonical job title. Alternatively, a subject matter expert or other user may review a set of raw job titles retrieved by a search and designate one or more canonical job titles based on an empirical analysis of the relevance of the harvested raw titles. For example, a user may designate "registered nurse" as a canonical title even though it appears less frequently than "R.N." in the sampled set of raw titles.

In some examples, the designated set of canonical titles may be sanitized prior to additional processing. Sanitization may involve, for example, removing stop words, removing some forms of punctuation (such as periods or commas), replacing hyphens with spaces, down-casing capital letters, or otherwise processing the raw titles to eliminate formatting, characters, or words that do not affect the semantics of the title. In some examples, sanitization may improve the speed and accuracy of the database generation.

b. Generate Set of n-Grams

In block 204, a set of n-grams may be generated for each canonical title designated in block 202. An n-gram may include one or more contiguous words in a title, where the number of contiguous words ranges from 1 to n. For n=3, the set of n-grams may include sets of unigrams (single words), bi-grams (two contiguous words), and tri-grams (three contiguous words) contained in the title. The number of n-grams generated for each title may depend on the number of words in the title (x) and on the value of n. In general, for an x-word title, there may be x unigrams, (x−1) bi-grams, and (x−2) tri-grams, etc. (assuming x is sufficiently large).

It is to be understood that there may be many ways of generating a set of n-grams from a title. For example, the n-grams may be generated manually, by having a user enter each n-gram for a title into a user interface, or the n-grams may be generated automatically using a parsing algorithm. The set of generated n-grams for a canonical title may be stored in the database along with the canonical title.

Continuing the example of normalizing job titles, FIG. 3 depicts a list of n-grams generated for a job title, for the case where n=3, i.e., where the largest potential n-grams for the title comprise three contiguous words in the title. In the example of FIG. 3, the title "registered charge nurse ICU" is a four-word title that may have the following set of n-grams generated therefrom: registered, charge, nurse, ICU (unigrams); registered charge, charge nurse, nurse ICU (bi-grams); registered charge nurse, charge nurse ICU (tri-grams). If n=4, the set of n-grams would also include "registered charge nurse ICU."

The value of n (that is, the maximum number of words that may be in an n-gram) may be selected based on characteristics of the type of title under consideration. For job titles, a value of n=3 has been empirically determined to provide good results for normalization purposes, although other values may also be used. For other types of titles or for languages other than English, a different value of n may be more appropriate.

c. Assign Attributes to n-Grams

Referring again to FIG. 2, in block 206, a set of attributes may be assigned to each n-gram. The same attributes may be assigned to every n-gram and may be based on key characteristics of the type of titles being normalized in the database. In the job title example, the set of attributes assigned to the n-grams may include, for example, job function, specialization, seniority, job category, and certification. In this case, each n-gram may have an associated set of the same five attributes.

Returning to the "nurse" example, the unigram "nurse" may have these five attributes assigned to it, as may the bi-gram "registered nurse," and every other n-gram in the designated canonical job title. As will be discussed below with respect to block 208, these attributes may be used to capture information about each n-gram, in the form of labels.

Although the example above describes the use of a specific set of five attributes, alternative sets of attributes may also be used to normalize job titles, depending on the job title characteristics of interest. Similarly, other types of titles to be normalized may be characterized by a different set of attributes. For example, for company titles, the set of assigned attributes may comprise industry, product, size, and location.

d. Assign Labels to Attributes

In block 208, a set of labels may be assigned to each attribute of each n-gram. These labels may help to capture the semantics of the title, and may subsequently be used to identify title variants that are semantically similar. In some examples, the labels may provide information related to the attribute and may be based on the words contained in each n-gram under consideration. For example, for a bi-gram of "registered nurse," the attribute job function may be assigned a label of "nurse," while the attribute certification may be assigned a label of "registered." The assigned labels may or may not comprise words contained in the n-gram. Each attribute may be assigned multiple labels, or may have no labels at all if the n-gram contains no relevant information pertaining to the attribute. For example, for the unigram "nurse," the certification attribute may have no associated label, since this unigram contains no information about certification. In some examples, a single label may comprise multiple words.

FIG. 4 depicts a table of n-grams, attributes, and labels. As depicted in FIG. 4, raw title "registered nurse, PICU" may have n-grams "registered," "nurse," PICU," "registered nurse," "nurse PICU," and "registered nurse PICU." The n-grams may have the attributes job function, specialization, certification, seniority, and job category. Each n-gram may have various labels assigned to relevant attributes. For example, the n-gram "nurse" may have the label "nurse" for attribute job function; "low" for seniority; and "nursing" for job category. Some attributes may have multiple labels assigned to them, while others have none.

The labels may be assigned to the attributes by manually entering them into a text box in a user interface, for example, or they may be selected from a menu of pre-defined labels. Alternatively, if a specific n-gram to be labeled has previously been labeled and stored in the database of canonical titles, the labels associated with the existing n-gram may be retrieved from the database and automatically assigned to the corresponding attribute of the current n-gram. In this manner, labels previously assigned to existing canonical titles may be automatically applied to new titles on the basis of matching n-grams. This approach may reduce the effort required to label the n-grams of new titles, and as the database of labeled canonical titles grows, it may enable automatic labeling of most new titles.

In some examples, to increase productivity, a user may assign labels to n-grams in order of n-gram size; that is, a user may assign labels first to all the unigrams, then to the bi-grams, then to the tri-grams, etc. In some examples, this approach may enable labels assigned to a unigram to be automatically propagated to bi-grams that contain that unigram. Similarly, labels associated with specific unigrams or bi-grams may be automatically propagated to tri-grams containing these unigrams and/or bi-grams. Again, this approach may reduce the effort required to label n-grams for new titles.

In some examples, a user may remove some of the labels that have been propagated up from smaller n-grams, based on additional context provided by the larger n-gram. For example, if a canonical job title is "nurse recruiter," the unigram "nurse" may have a label of "nurse" assigned to the attribute job function. This label may subsequently be propagated to the job function attribute for the bi-gram "nurse recruiter." However, upon analyzing the bi-gram "nurse recruiter," it may be determined that the label "nurse" is not an appropriate label for this bi-gram, and this label may be removed from the attribute associated with the bi-gram (though it remains assigned to the job function attribute associated with the "nurse" unigram). Thus, a bi-gram (or tri-gram) may not be assigned all of the labels of its constituent unigrams (or bi-grams).

One result of the above labeling approach may be that a single title has the same label assigned to it multiple times; for example, the title "registered nurse" may have the label "nurse" assigned to both its "nurse" unigram and its "registered nurse" bi-gram; thus, the title may be associated with two instances of the label "nurse." In contrast, the title "nurse recruiter" may have the label "nurse" assigned to the unigram "nurse," but not to the bi-gram "nurse recruiter." Thus, this title may be associated with only one instance of the label "nurse."

The process of assigning labels to attributes may be further refined by merging previously assigned labels that are subsequently determined to be synonymous. For example, "ICU" (Intensive Care Unit) may be determined to be semantically equivalent to "CCU" (Critical Care Unit). In this case, the two labels may be merged such that a single label may be used to represent both variants. The single label selected for this purpose may be the most frequently occurring of the variants, or may be selected on another basis. This single label may then be substituted across the canonical database for all label instances containing any of the equivalent variants.

5. White-Box Validation

Figure 5:
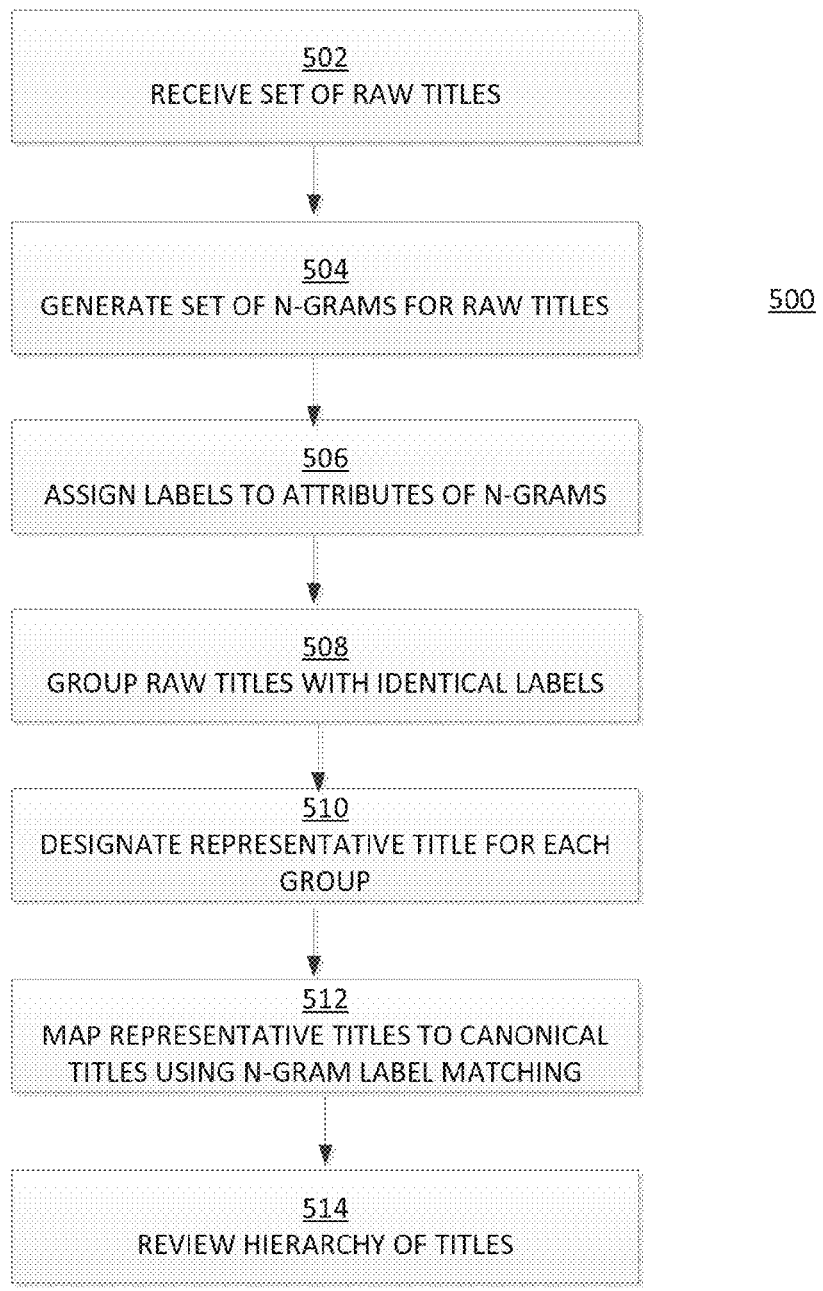
FIG. 5 depicts an exemplary process for white-box validation.

Once the database of labeled canonical titles has been generated, it may be validated and refined using white-box validation. FIG. 5 depicts an exemplary method 500 for performing white-box validation, as depicted in block 104 of FIG. 1.

In the example of FIG. 5, in block 502, a set of raw titles may be received. The set of raw titles may be received from a search engine that retrieved the titles from a database of user profiles, for example, or may be received from a user, or from a file on a disk, or from some other source. In some examples, the set of raw titles may be sanitized prior to further processing, in a manner similar to that described with respect to FIG. 1.

In block 504, a set of n-grams may be generated for each of the raw titles received in block 502. The n-grams may be generated as described earlier with respect to FIG. 2.

In block 506, a set of labels may be assigned to the attributes associated with each of the n-grams generated in block 504. (The attributes of the raw titles may comprise the same attributes as those used for the canonical titles in the database.) The labels may be assigned as described earlier with respect to FIG. 2. In some cases, the labels may be automatically assigned to the raw titles by looking up the n-grams of the raw titles in the database of labeled canonical titles and retrieving the labels associated with these n-grams.

In block 508, raw titles having identical labels may be grouped together. These groups may include raw titles that are considered semantically similar or equivalent.

In block 510, a representative title may be designated for each group of titles with identical labels. The representative title may be selected to represent this group of raw titles. In some examples, the representative title may be automatically selected by choosing the most frequently occurring raw title in a group to represent the group. In alternative examples, a representative title may be designated by a user or automatically selected based on some other criteria. The representative title may serve as an intermediate title between raw titles and canonical titles, and provide a means for efficient review of the mapping of raw titles to canonical titles.

In block 512, each representative title may be mapped to a canonical title in the database. In some examples, the representative titles may be mapped to canonical titles using an n-gram label matching algorithm, as discussed below with respect to FIG. 6.

In block 514, a hierarchy of titles may be reviewed to determine whether raw job titles are accurately represented by representative job titles, and whether representative job titles have been accurately mapped to canonical job titles by the n-gram label matching algorithm. This review may enable a user (or program) to determine whether the labels assigned to the raw titles have enabled accurate designation of a representative title (i.e., whether the raw titles grouped together by labels are truly semantically equivalent), and whether labels associated with canonical titles have enabled the n-gram matching algorithm to provide good matching between representative titles and canonical titles.

In some examples, the hierarchy may reviewed by viewing it on a graphical user interface. In some examples, the hierarchy of titles may comprise canonical titles, representative titles, and raw titles. FIG. 7 depicts a screenshot of a graphical user interface for reviewing a hierarchy of titles. Each canonical title may be shown with the representative titles that have been mapped to that canonical title, along with the raw titles that are represented by the representative title. All of the raw titles may therefore be mapped to the single canonical title shown above them. Lower levels of the hierarchy may be collapsed to enable viewing only the higher levels; for example, it may be possible to view only the canonical titles and representative titles, without viewing the raw titles. By reviewing representative titles that represent groups of raw titles rather than reviewing each individual raw title, the number of titles to be reviewed may be significantly reduced, thus increasing the speed and efficiency of the review process.

Based on the review of the hierarchy of job titles, a user may decide to update the n-gram labels associated with the canonical titles in the database to enable the n-gram matching algorithm to perform more accurate mapping of raw titles to canonical titles.

In alternate examples, the review may be performed automatically by a computer to determine whether raw job titles are accurately represented and mapped.

6. N-Gram Label Matching Method

An n-gram label matching algorithm may be used to map new titles to labeled canonical titles. This algorithm may be an integral part of the title normalization system described herein; it may be used as part of the process of validating the database, as previously discussed with respect to FIG. 5, and may also be used for searching, analyzing, and aggregating titles across databases, as will be discussed later with respect to FIG. 11.

Figure 6:
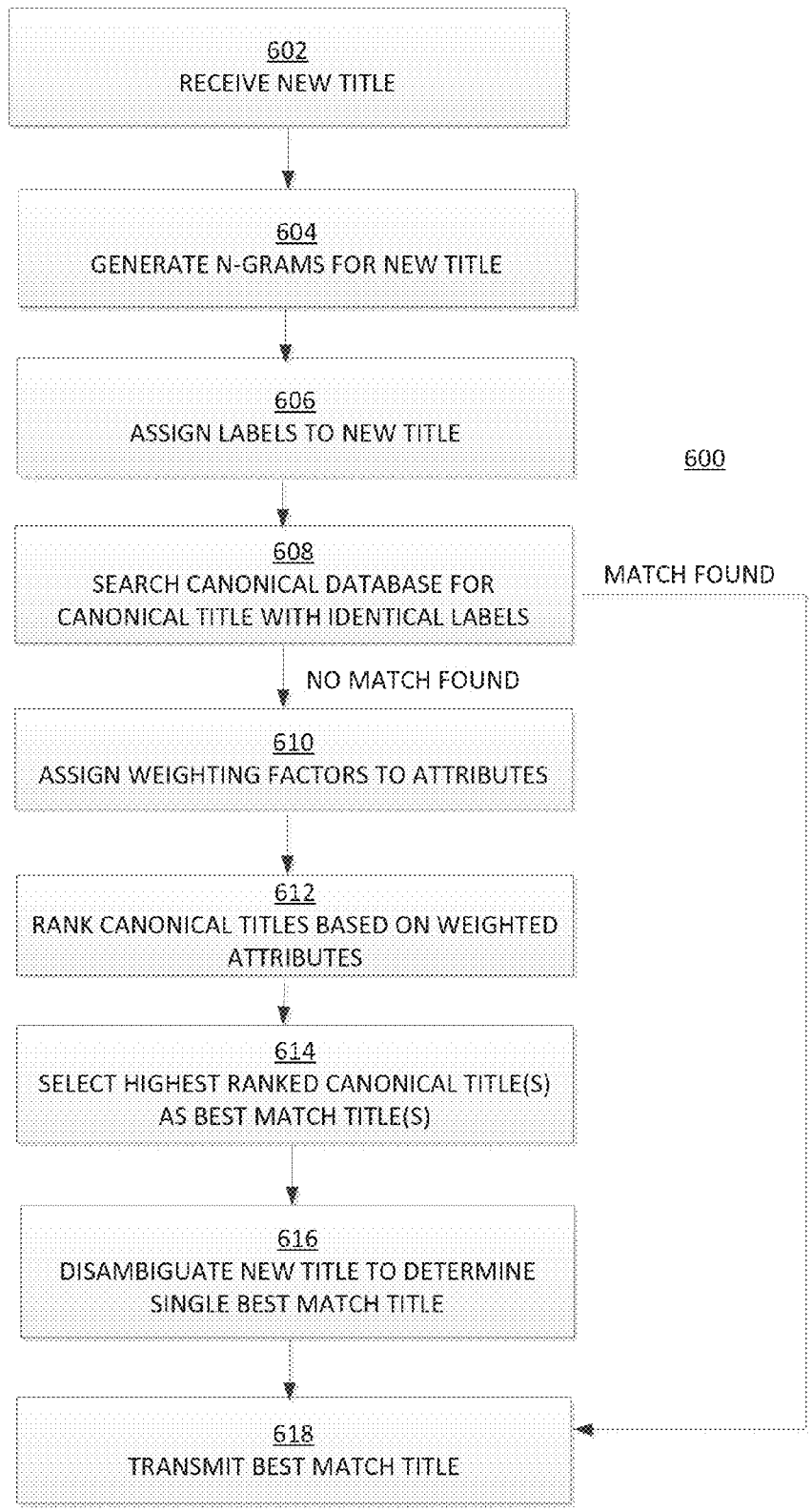
FIG. 6 depicts an exemplary n-gram label matching algorithm for mapping new titles to canonical titles.

FIG. 6 depicts an exemplary n-gram label matching algorithm 600 for mapping new titles to labeled canonical titles by choosing a "best match" canonical title, as depicted in block 512 of FIG. 5.

In the example of FIG. 6, in block 602, a new title may be received. This new title may be received as a result from a database search, for example, or it may be input by a user for the purpose of searching a database for similar titles, for example. In some examples, the new title may be a raw title.

In block 604, a set of n-grams may be generated for the new title. In some examples, n-grams may be generated as described with respect to FIG. 2.

In block 606, labels may be assigned to the new title. In some examples, a set of labels may be assigned to each attribute of each n-gram of the new title, as previously described. In some examples, labels may be manually assigned by a user. In other examples, labels may be automatically assigned by looking up the new title's n-grams in the database of labeled canonical titles, and retrieving the labels associated with those n-grams from the database. In some examples, the new title may not require labeling; for example, the new title may have been previously labeled before being received in block 602.

In block 608, the database of labeled canonical titles may be searched to determine if any canonical titles have labels that are identical to those of the labeled new title. For the labels to be considered identical, the canonical title and new title must have the same labels assigned to the same attributes. If there is a canonical title having labels that are identical to those of the new title, that canonical title may be selected as the best match for the new title.

If no best match is found in block 608, then in block 610, a weighting factor may be assigned to each of the attributes. In some examples, the attributes may be weighted to emphasize certain title characteristics for matching. For example, a job function attribute may be weighted more heavily than a seniority attribute because job function may be considered a more important matching characteristic. The weighting factor may be used to help identify a best match canonical title as described below.

In block 612, the canonical titles may be ranked based on the weighted attributes to determine the best match for the new title. In the above example, a canonical title having similar or identical labels for the job function attribute (relative to the job function labels for the new title) may be ranked higher than canonical titles having similar or identical labels for other attributes.

In block 614, the highest ranked canonical title (or titles, if multiple canonical titles have the same ranking) may be selected as the best match title(s).

If multiple canonical titles were selected as the best matches in block 614, then in block 616, the new title may be disambiguated to determine a single best match title. In some examples, this disambiguation may determine which of the best match canonical titles selected in block 614 is the single most appropriate best match title for the new title. In some examples, the new title may be disambiguated as described in more detail later, with respect to FIG. 9.

In block 618, the best match canonical title selected in block 608, 614, or 616 may be transmitted. The best match canonical title may be transmitted for use in white-box validation review, for example, or may be transmitted to some other user interface, or to disk for storage.

It should be appreciated that, because the n-gram label matching algorithm described above may be based on matching n-gram labels that capture title characteristics rather than being based on matching the titles themselves (or on matching the n-grams), a new title may be mapped to a canonical title that contains none of the same constituent words, but is semantically equivalent. For example, a new title of "canine coach" may be automatically mapped to a canonical title of "animal trainer" on the basis of their associated labels, even though the two titles have no words in common.

7. Black-Box Validation

Returning to the exemplary methods for generating and validating the database as depicted in FIG. 1, the next type of Black-box validation may be used to compare the mapping of a single set of raw titles to a set of canonical titles using two different methodologies. In some examples, one of the methodologies may be a "baseline" methodology that is assumed to provide good mapping accuracy, and the other methodology may be an n-gram label matching algorithm as described above with respect to FIG. 6. Black-box validation may provide an assessment of whether the current n-gram labels in the canonical database enable the n-gram matching algorithm to perform sufficiently accurate mapping, relative to the baseline methodology.

Figure 8:
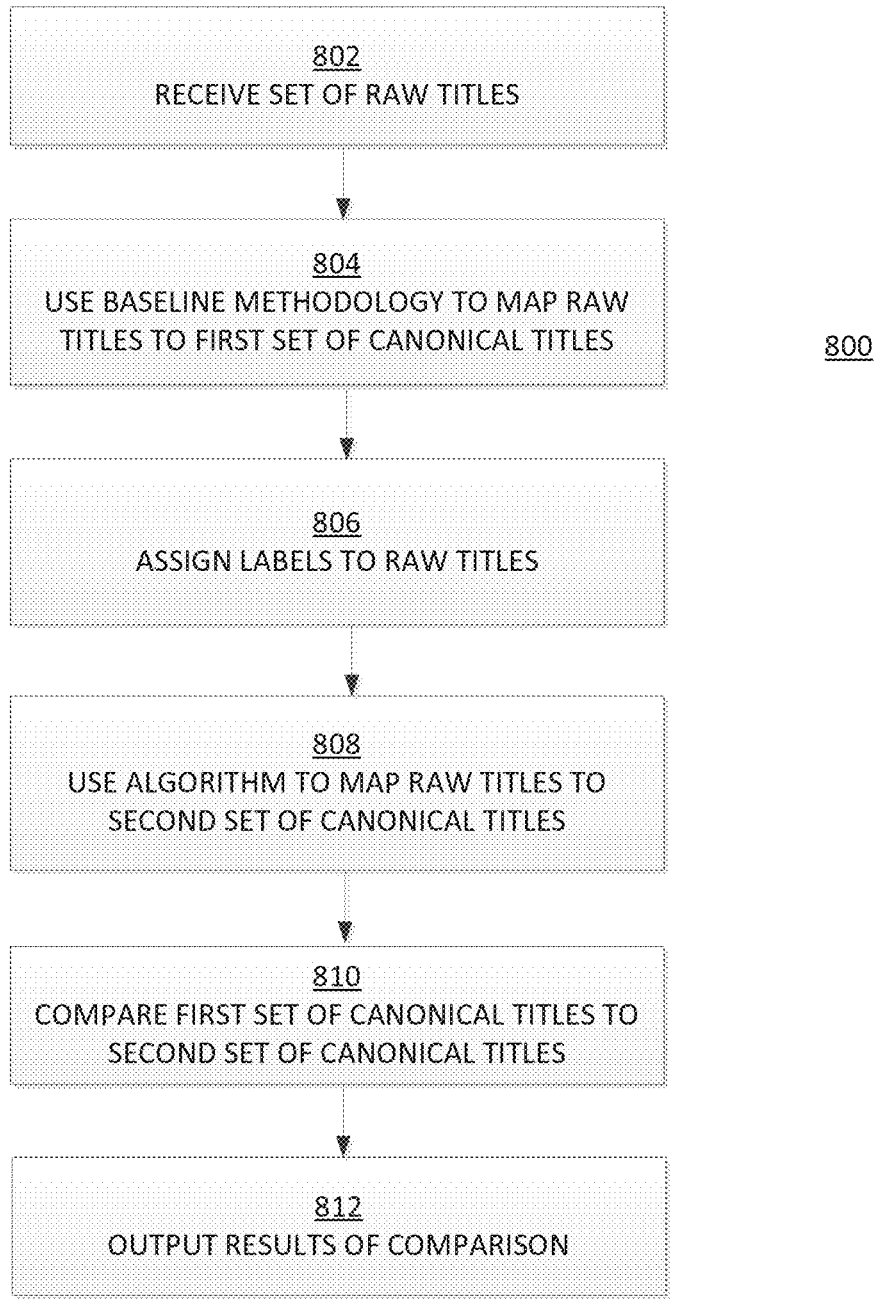
FIG. 8 depicts an exemplary process for black-box validation.

FIG. 8 depicts an exemplary process 800 for black-box validation.

In the example of FIG. 8, in block 802, a set of raw titles may be received. The set of raw titles may be received from a search engine that retrieved the titles from a database of user profiles, for example, or may be received from a user, or from an electronic file on a disk, or from some other source. The set of raw titles may be the same set of raw titles used for white-box validation or may be a different set of raw titles.

In block 804, the set of raw titles may be mapped to a first set of canonical titles in the database of labeled canonical titles using a baseline methodology. In some examples, the baseline methodology may involve having a person manually map raw job titles to canonical titles in the database based on an empirical analysis of the raw title and (in some examples) based on associated metadata, such as education, previous job titles, or other types of data. In other examples, the baseline methodology may comprise mapping raw titles to canonical titles using a different type of manual or algorithmic approach. In some examples, the baseline methodology may be considered as a "gold standard" that is assumed to provide 100% mapping accuracy.

In block 806, labels are assigned to the attributes of the n-grams of the raw titles, as previously described with respect to FIGS. 2 and 6.

In block 808, the labeled raw titles are mapped to a second set of canonical titles in the database of canonical titles, using an n-gram label matching algorithm such as that described with respect to FIG. 6.

In block 810, the first set of canonical titles (generated in block 804) may be compared to the second set of canonical titles (generated in block 808). In some examples, the two sets of canonical job titles may be automatically compared to assess the accuracy of the n-gram label matching algorithm.

In block 812, the results of the comparison of the first set of canonical titles to the second set of canonical titles may be output. This comparison may be output on a display screen, for example. The output may include a complete or partial listing of the two sets of canonical titles, for example, or statistics regarding the mapping accuracy of the n-gram label matching algorithm relative to the baseline methodology. The output may include the percentage of false positives (i.e., cases where a raw job title was incorrectly matched to a canonical job title when it should not have been matched) and the percentage of false negatives (i.e., cases where a raw job title should have been matched to a canonical job title but was not) relative to the set of canonical titles generated by using the baseline methodology. Such statistics may be used to determine whether to revise the n-gram labels of the canonical titles to enable better mapping.

8. Disambiguation of Titles

As previously discussed with respect to FIG. 6, in some cases, a new title may initially be mapped to two or more canonical titles. For example, a new job title of "CNA" may initially be mapped to two canonical titles, "Certified Nurse Assistant" and "Certified Network Administrator." This ambiguity may require additional disambiguation during the mapping process to identify the most appropriate canonical title for the new title.

Figure 9:
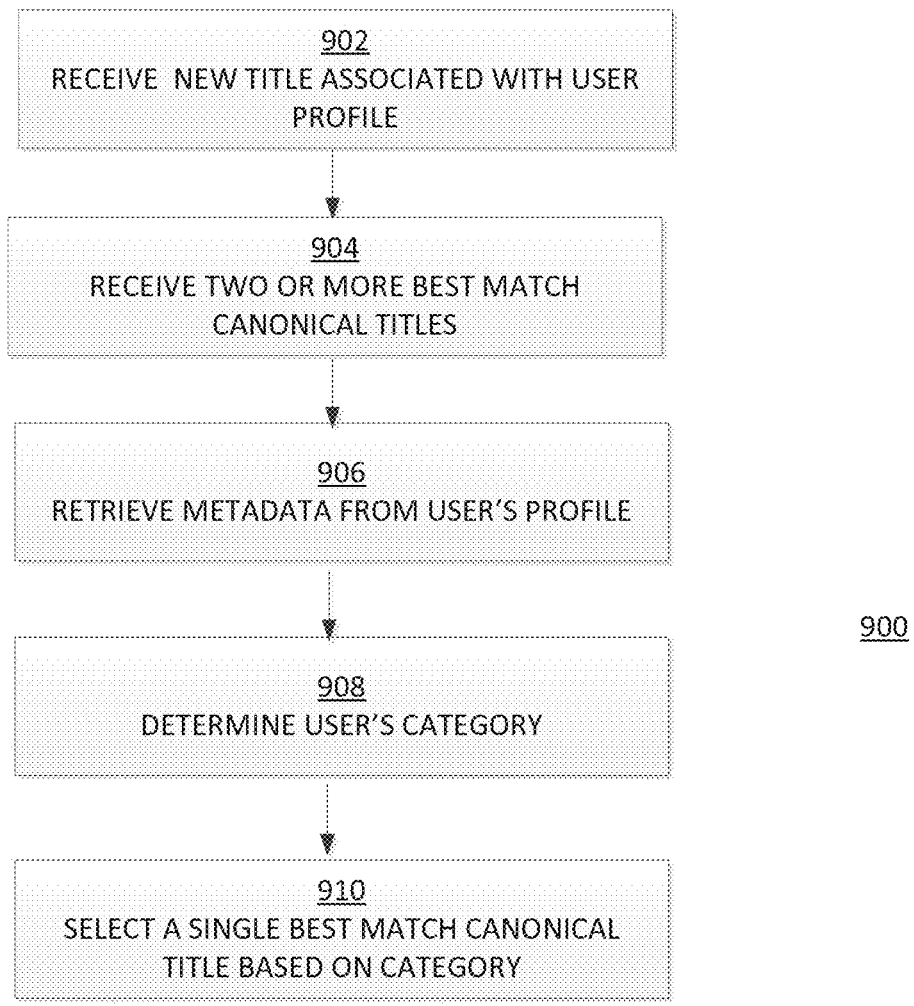
FIG. 9 depicts an exemplary process for disambiguating job titles.

FIG. 9 depicts an exemplary process 900 for disambiguating new titles. This process may be used to identify a single best match canonical title in cases where a new title may initially be mapped to multiple canonical titles.

In the example of FIG. 9, in block 902, a new title associated with a user profile may be received. The new title may be received from a user, for example, or may be received as a parameter from an n-gram label matching algorithm as described with respect to FIG. 6.

In block 904, two or more selected canonical titles may be received. In some examples, the two or more canonical titles may have been selected as best match canonical titles for the new title received in block 902 based on an n-gram label matching algorithm as described previously with respect to FIG. 6, for example, or may have been selected based on another mapping methodology.

In block 906, metadata may be retrieved from the user profile associated with the new title received in block 902. Such metadata may include, for example, education, geographic location, previous job titles, current employers, and previous employers.

In block 908, the metadata retrieved in block 906 may be used to determine a user's category. In the example of job titles, the category may be the industry associated with the user's current or previous employer, which may be determined by looking up the current or previous employer in a database to identify the industry using public data or purchased data. In alternative examples, the category may be determined by looking up educational information, geographic location, or other metadata, for example.

In block 910, a single best match canonical title may be selected from the two or more canonical titles received in block 904, based on the category determined in block 908. In some examples, the single best match canonical title is selected by selecting the canonical title that is statistically most likely to be associated with the category determined in block 908. Such statistics regarding titles' associations with categories may have been previously collected, calculated, or purchased, for example.

As an example, recall that a new job title of CNA may be mapped to two canonical titles: Certified Nurse Assistant and Certified Network Administrator. In this example, if the user's industry is determined to be Healthcare, the canonical title of Certified Nurse Assistant may be selected as the best match title rather than Certified Network Administrator because the title Certified Nurse Assistant may be determined to be statistically more likely to be associated with the Healthcare industry than the title Certified Network Administrator. Conversely, if a user's industry is determined to be Computer Hardware, the title of Certified Network Administrator may be selected as the single best match canonical title.

9. Generation of Function Tree

Figure 10:
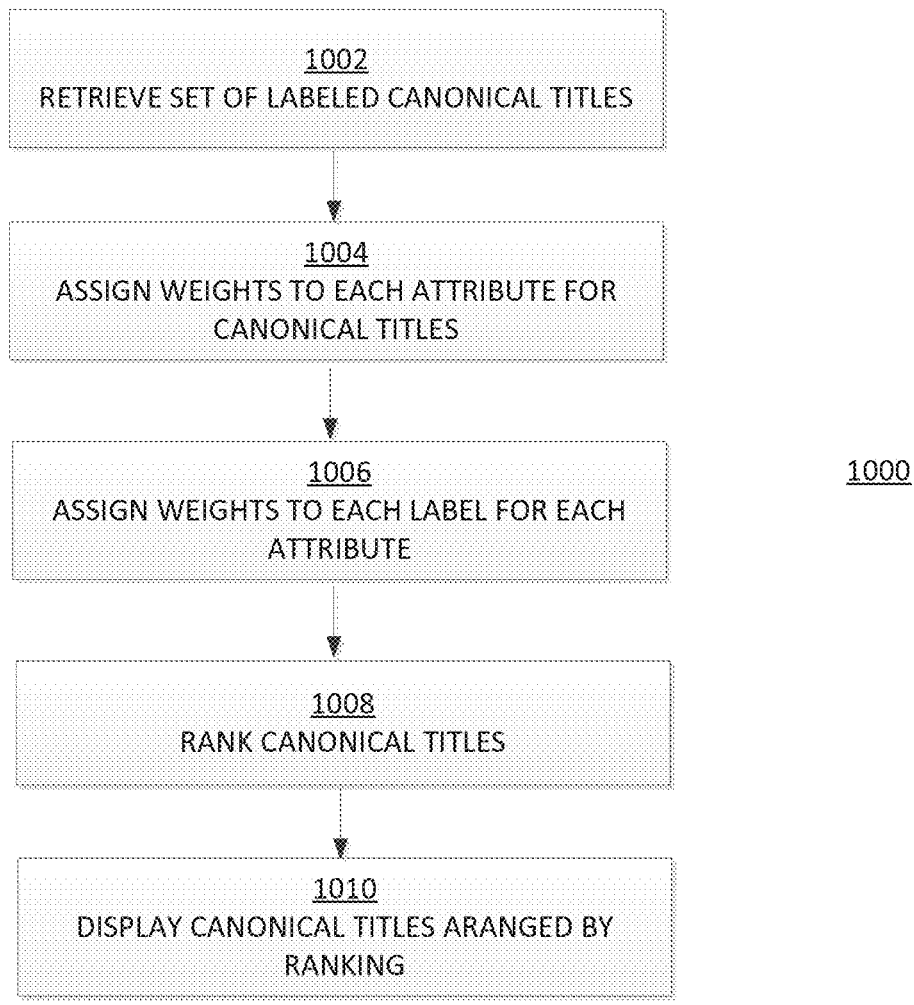
FIG. 10 depicts an exemplary process for generating a function tree.

FIG. 10 depicts an exemplary process 1000 for generating a function tree. A function tree may be a visual representation of relationships between canonical titles. In the context of job titles, a function tree may represent typical career paths, for example.

In the example of FIG. 10, in block 1002, a set of labeled canonical titles for a category may be retrieved from a database of labeled canonical titles. In the example of job titles, the category may be a specific industry, for example.

In block 1004, weights may be assigned to each attribute of the canonical titles. For example, an attribute of job function may be ranked more highly than an attribute of certification. These weights may be assigned in a manner similar to that previously described with respect to FIG. 6.

In block 1006, weights are assigned to each label of each attribute of the canonical titles. For example, a label of "nurse" may be weighted more heavily than a label of "phlebotomist." These weights may be assigned in a manner similar to the method described for assigning weights to attributes.

In block 1008, the set of labeled canonical titles may be ranked first by attributes, then by labels. This ranking groups titles with similar attributes together, and with similar labels within those attributes. In other examples, the canonical titles may be ranked only by attributes or only by labels, for example.

In block 1010, the canonical titles are arranged by their rankings and displayed as a function tree. In some examples, canonical titles having the same ranking are displayed on the same vertical level, while titles having higher rankings are displayed at a higher level than titles having lower rankings.

Figure 15:
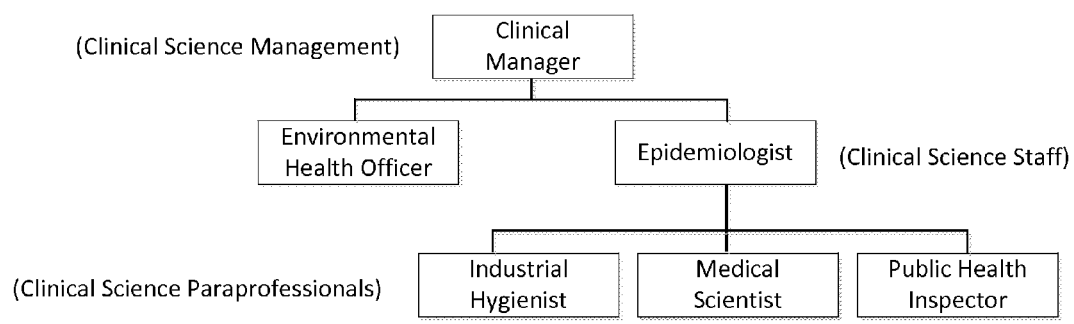
FIG. 15 depicts an exemplary function tree.

FIG. 15 depicts a function tree for a set of canonical job titles. In the example of FIG. 15, the function tree may depict typical career paths for a person having a job represented by the canonical title "clinical manager." One career path may begin with a job represented by any of the representative canonical titles "industrial hygienist," "medical scientist," or "public health inspector," followed by a job represented by the canonical title "epidemiologist," followed by a job represented by the canonical title "clinical manager." Another path may begin with a job represented by the canonical title "environmental health officer," followed by a job represented by the canonical title "clinical manager."

10. Method for Mapping a New Title to a Canonical Title

As previously discussed, title normalization has two aspects: first, a database of labeled canonical titles may be generated and validated, as described previously with respect to FIGS. 1-9. Once the database has been generated, it can be used by an n-gram label matching algorithm to map new titles to existing canonical titles. This second aspect may enable, for example, a recruiter to input a desired new title that will be mapped to a canonical title, which can then be used to identify candidate profiles whose job titles have been mapped to the same canonical title.

Figure 11:
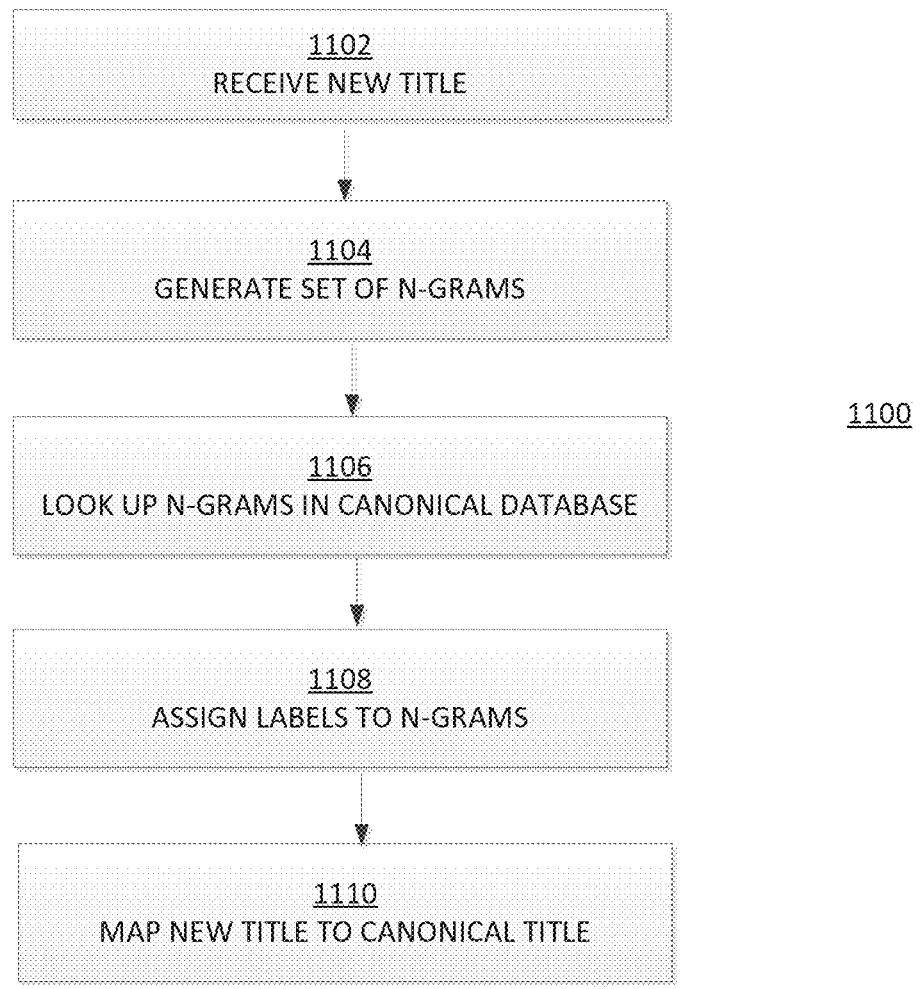
FIG. 11 depicts an exemplary process for mapping a new title to a canonical title in a canonical title database.

FIG. 11 depicts an exemplary process 1100 for mapping a new title to a canonical title in a database of labeled canonical titles.

In the example of FIG. 11, in block 1102, a new title may be received. In some examples, the new title may be entered by a user into a graphical user interface, or may be retrieved from a database of user profiles. In some examples, the new title may be a raw title.

In block 1104, a set of n-grams may be generated for the new title received in block 1102. The n-grams may be generated as previously described with respect to FIG. 2, for example.

In block 1106, the n-grams generated in block 1104 are used to search the canonical title database for identical n-grams and retrieve the attribute labels associated with those n-grams.

In block 1108, the n-gram attribute labels retrieved from the canonical database may be assigned to the corresponding attributes of the n-grams of the new title, thus creating a labeled new title. In some examples, a user may assign labels to the attributes of the n-grams of the new title.

In block 1110, the labeled new title may be mapped to a canonical title using the n-gram matching algorithm, as described earlier with respect to FIG. 6.

Once the new title has been mapped to a canonical title as described above, this canonical title may be used to search a database of user profiles and identify users having titles that have been mapped to the same canonical title. In this sense, the canonical title may provide a bridge between a new title and titles contained in user profiles.

FIG. 12 depicts an exemplary labeled new title, "certified nurse midwife" and its associated n-grams and labels. FIGS. 13A-C depict three candidate canonical titles to which the new title depicted in FIG. 12 may be mapped on the basis of label similarities: "advanced practice registered nurse," "certified nurse aide," and "registered nurse." In some examples, if the job function attribute has been weighted more heavily than the other attributes, then the best match canonical title may be selected as "advanced practice medical nurse" because the job function labels assigned to this canonical title are the best match for the job function labels assigned to the new title, "certified nurse midwife." In other examples, other attributes or labels may be weighted more heavily, leading to a different selection of a best match canonical title.

11. Implementation on a Computer Hardware Platform

Figure 14:
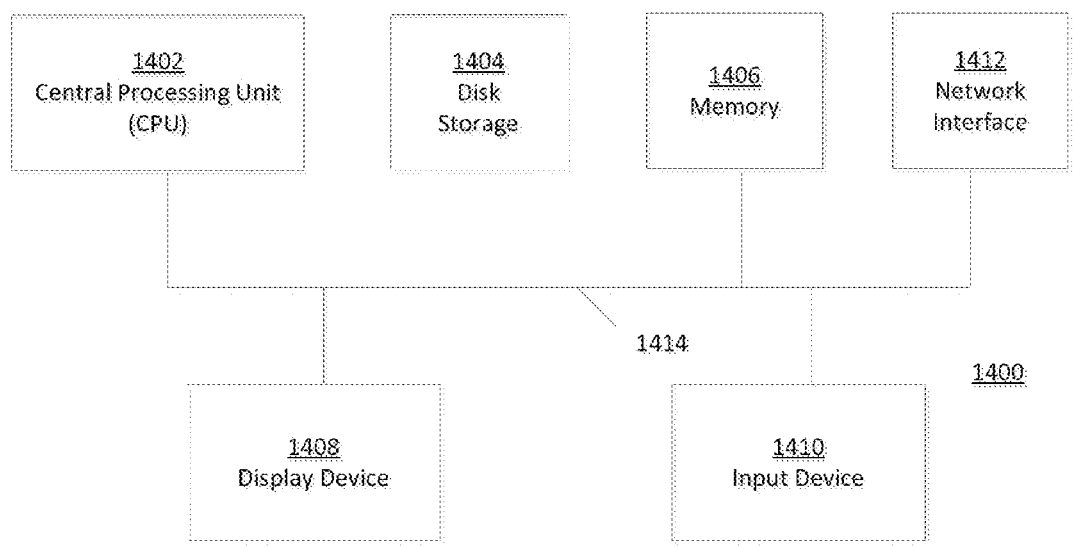
FIG. 14 depicts an exemplary system for performing normalization of titles.

The methods described previously with respect to FIGS. 1-13 and 15 may be implemented on a computer hardware platform. FIG. 14 depicts a computer system 1400 with several standard components that may be used to perform certain aspects of the functionality associated with mass normalization of titles. Specifically, the computer system 1400 includes a central processing unit (CPU) 1402 to execute computer-readable instructions; non-transitory computer memory 1406 to store computer-readable instructions; disk storage 1404 for storing data and computer-readable instructions; a network interface 1412 for accessing a network; a display device 1408 for displaying system outputs; and an input device 1410 for receiving input from a user. The CPU, memory, disk, display, network, and input units are connected by one or more bidirectional buses 1414 that transmit data and/or computer-readable instructions between the units.

The computer system 1400 of FIG. 14 may be used, for example, to implement mass normalization of titles as described with respect to FIGS. 1-13 and 15. For example, a user may input an initial set of canonical titles using the input device, and store these titles in disk storage. The CPU may be used to break titles into n-grams, and run graphical user interfaces that allow users to assign labels to n-grams or to run validation tools. The display may be used to view the hierarchy of titles during white-box validation, for example, or to display a list of user profiles that meet some criteria. The network interface may be used to access internal or external networks to retrieve user profiles, titles, or metadata, for example. The memory may be used to store computer programs for mapping raw titles to canonical titles, for example.

The previous descriptions are presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

What is claimed is:

1. A method for generating a database of labeled canonical titles, the method comprising:
   designating a set of canonical titles;
   generating a set of canonical n-grams for each canonical title, wherein each canonical n-gram includes one or more contiguous words in the canonical title;
   assigning a set of canonical attributes to each canonical n-gram in the set of canonical n-grams;
   assigning a set of canonical labels to one or more of the canonical attributes for each canonical n-gram;
   storing at least one of each canonical title, the set of canonical n-grams generated for each canonical title, the set of canonical attributes assigned to each of the canonical n-grams, or the set of canonical labels assigned to each of the canonical attributes in the database of labeled canonical titles;
   receiving a set of raw titles;
   generating a set of raw n-grams for each raw title, wherein each raw n-gram includes one or more contiguous words in the raw title;
   assigning a set of raw labels to one or more attributes in a set of attributes assigned to each raw n-gram, wherein the set of attributes assigned to the raw n-grams and the set of canonical attributes assigned to the canonical n-grams are the same set;
   grouping the raw titles with identical raw labels into representative groups;
   selecting a raw title from each representative group to be a representative title;
   mapping each representative title to one of the canonical titles based on a comparison of the raw labels associated with each representative title to the canonical labels associated with each canonical title; and
   verifying that the representative titles are correctly mapped to the canonical titles, and that the raw titles are correctly represented by the representative titles.

2. The method of claim 1, wherein receiving a set of raw titles comprises receiving the set of raw titles from a title search.

3. The method of claim 1, wherein receiving a set of raw titles comprises receiving the set of raw titles entered by a user.

4. The method of claim 1, wherein generating a set of raw n-grams for a raw title comprises:
   generating a set of raw unigrams, wherein each raw unigram is one word in the raw title;
   generating a set of raw bi-grams, wherein each raw bi-gram is two contiguous words in the raw title; and
   generating a set of raw tri-grams, wherein each raw tri-gram is three contiguous words in the raw title.

5. The method of claim 1, wherein assigning a set of raw labels comprises:
   searching the database of labeled canonical titles for the canonical n-grams that match the raw n-grams of one or more of the raw titles; and
   for each canonical n-gram that matches a raw n-gram of the one or more raw titles:
   retrieving the canonical labels assigned to each canonical attribute of the matched canonical n-gram; and
   assigning the retrieved canonical labels to the raw attribute of the raw n-gram of the one or more raw titles, the raw attribute being the same as the canonical attribute associated with the retrieved canonical labels.

6. The method of claim 1, wherein selecting a raw title comprises selecting the most frequently occurring raw title in the representative group as the representative title.

7. The method of claim 1, wherein mapping each representative title to one of the canonical titles comprises:
   searching the database of labeled canonical titles for a canonical title having labels that are identical to the set of raw labels assigned to the representative title;
   selecting the canonical title having the identical labels as a best match title; and
   if no best match title is found:
   assigning weighting factors to the raw attributes;
   ranking the canonical titles in the database of labeled canonical titles based on the weighting factors; and
   selecting the highest ranked canonical title as the best match title.

8. A method for generating a database of labeled canonical titles, the method comprising:
   designating a set of canonical titles;
   generating a set of canonical n-grams for each canonical title, wherein each canonical n-gram includes one or more contiguous words in the canonical title;
   assigning a set of canonical attributes to each canonical n-gram in the set of canonical n-grams;
   assigning a set of canonical labels to one or more of the canonical attributes for each canonical n-gram;
   storing at least one of each canonical title, the set of canonical n-grams generated for each canonical title, the set of canonical attributes assigned to each of the canonical n-grams, or the set of canonical labels assigned to each of the canonical attributes in the database of labeled canonical titles;
   receiving a set of raw titles;
   generating a set of raw n-grams for each raw title, wherein each raw n-gram includes one or more contiguous words in the raw title;
   assigning a set of raw labels to one or more attributes in a set of attributes assigned to each raw n-gram, wherein the set of attributes assigned to the raw n-grams and the set of attributes assigned to the canonical n-grams are the same set;
   mapping the set of raw titles to a first set of the canonical titles;
   mapping the set of raw titles to a second set of the canonical titles; and
   comparing the first set of the canonical titles to the second set of the canonical titles to determine differences therebetween.

9. The method of claim 8, wherein mapping the set of raw titles to a first set of the canonical titles comprises selecting canonical titles from the database of labeled canonical titles to represent each raw title in the set of raw titles.

10. The method of claim 8, wherein mapping the set of raw titles to a second set of the canonical titles comprises comparing the raw labels assigned to each attribute of each raw n-gram of each raw title to the canonical labels assigned to each attribute of each canonical n-gram of each canonical title to find a best match.

11. A method for generating a database of labeled canonical titles, the method comprising:
   designating a set of canonical titles;
   generating a set of canonical n-grams for each canonical title, wherein each canonical n-gram includes one or more contiguous words in the canonical title;
   assigning a set of canonical attributes to each canonical n-gram in the set of canonical n-grams;
   assigning a set of canonical labels to one or more of the canonical attributes for each canonical n-gram;
   storing at least one of each canonical title, the set of canonical n-grams generated for each canonical title, the set of canonical attributes assigned to each of the canonical n-grams, or the set of canonical labels assigned to each of the canonical attributes in the database of labeled canonical titles;

receiving a subset of the canonical titles, including the set of canonical attributes assigned to the canonical titles in the subset and the set of canonical labels assigned to the set of canonical attributes;

assigning a weight to each of the canonical attributes in the subset;

assigning a weight to each of the canonical labels in the subset;

ranking the subset of canonical titles by the canonical attribute weight and the canonical label weight; and displaying the subset of canonical titles arranged in order of ranking.

12. The method of claim 11, wherein displaying comprises:

displaying the canonical titles in the subset having the same ranking on the same level; and displaying the canonical titles in the subset having higher rankings on a higher level than the canonical titles in the subset having lower rankings.

13. A method of mapping a raw title to a canonical title in a database of labeled canonical titles, the method comprising:

receiving a raw title;

generating a set of raw n-grams for the raw title, wherein each raw n-gram includes one or more contiguous words in the raw title;

assigning a set of raw attributes to each raw n-gram in the set of raw n-grams, wherein the set of raw attributes is the same as a set of canonical attributes associated with canonical titles stored in the database of labeled canonical titles; and assigning a set of raw labels to one or more of the raw attributes for each raw n-gram; and determining one or more best match canonical titles in the database of labeled canonical titles based on a comparison of the raw attributes and the raw labels to the set of canonical attributes and a set of canonical labels associated with each of the canonical titles in the database of labeled canonical titles, wherein determining the one or more best match canonical titles comprises:

searching the database of labeled canonical titles for a canonical title having labels that are identical to the set of raw labels;

selecting this canonical title as the best match title; and if no best match title is found:

assigning weighting factors to the raw attributes;

ranking the canonical titles in the database of labeled canonical titles based on the weighting factors; and selecting the highest ranked canonical titles as the one or more best match canonical titles.

14. A method of mapping a raw title to a canonical title in a database of labeled canonical titles, the method comprising:

receiving a raw title;

generating a set of raw n-grams for the raw title, wherein each raw n-gram includes one or more contiguous words in the raw title;

assigning a set of raw attributes to each raw n-gram in the set of raw n-grams, wherein the set of raw attributes is the same as a set of canonical attributes associated with canonical titles stored in the database of labeled canonical titles;

assigning a set of raw labels to one or more of the raw attributes for each raw n-gram; and determining one or more best match canonical titles in the database of labeled canonical titles based on a comparison of the raw attributes and the raw labels to the set of canonical attributes and a set of canonical labels associated with each of the canonical titles in the database of labeled canonical titles, sanitizing the raw title prior to generating a set of raw n-grams, wherein the sanitizing comprises:

removing stop words from the raw title;

down-casing uppercase letters in the raw title;

removing a first set of punctuation marks from the raw title; and replacing a second set of punctuation marks with spaces in the raw title.

15. The method of claim 13, wherein the set of raw attributes assigned to each raw n-gram is the same.

16. The method of claim 1, wherein generating a set of canonical n-grams for a canonical title comprises:

generating a set of canonical unigrams, wherein each canonical unigram is one word in the canonical title;

generating a set of canonical bi-grams, wherein each canonical bi-gram is two contiguous words in the canonical title; and generating a set of canonical tri-grams, wherein each tri-gram is three contiguous words in the canonical title.

17. The method of claim 1, wherein the set of canonical attributes assigned to each canonical n-gram is the same.

18. The method of claim 1, wherein assigning a set of canonical labels comprises: receiving the set of canonical labels entered by a user; and assigning the received set of canonical labels to the canonical attributes.

19. The method of claim 1, wherein assigning a set of canonical labels comprises: retrieving one or more canonical labels previously assigned to previously generated canonical n-grams; and for each previously generated canonical n-gram that matches one or more of the canonical n-grams in the set of canonical n-grams generated for each canonical title:

assigning the retrieved previously assigned canonical labels to one or more of the canonical attributes assigned to the matched canonical n-gram.

* * * * *